United States Patent [19]

Glater

[11] Patent Number: 4,556,355

[45] Date of Patent: Dec. 3, 1985

[54] SINGLE LOOP LOAD/UNLOAD DRIVE ARRANGEMENT WITH LATCHING PUSH MEMBER FOR STORAGE AND RETRIEVAL SYSTEM

[75] Inventor: Michael Glater, New York, N.Y.

[73] Assignee: Supreme Automation Corporation, Piscataway, N.J.

[21] Appl. No.: 524,033

[22] Filed: Aug. 17, 1983

[51] Int. Cl.$^4$ .............................................. B65G 1/04
[52] U.S. Cl. .................................. 414/280; 198/728; 198/812
[58] Field of Search ............................ 414/234–238, 414/280, 286, 659–661; 198/728, 812; 104/25, 162

[56] References Cited

U.S. PATENT DOCUMENTS

4,352,622  10/1982  Wieschel ............................. 414/661
4,394,104  7/1983  Camerini et al. .................... 414/280

*Primary Examiner*—Robert G. Sheridan

[57] ABSTRACT

An article transfer arrangement of the type which is utilized to retrieve and store articles which are arranged in a matrix of compartments, such as in a warehouse. In a preferred embodiment, a push member which urges an article on the transfer arrangement into a selected one of the storage compartments is provided with a latching mechanism which facilitates withdrawal of an article which has become jammed during the storage procedure as a result of misalignment. In embodiments where the articles are tote bins of the type which are generally used in such storage systems, the exterior of the tote bins is provided with a depending member having push and pull surfaces. During the storing procedure, the push member communicates with the push surface of the depending member while the latching mechanism latchingly communicates with the pull surface. In case of a misalignment, the latching mechanism rigidly engages the pull surface so that reversal of the direction of drive pulls the tote bin outwardly of the storage compartment.

9 Claims, 8 Drawing Figures

SINGLE LOOP LOAD/UNLOAD DRIVE ARRANGEMENT WITH LATCHING PUSH MEMBER FOR STORAGE AND RETRIEVAL SYSTEM

BACKGROUND OF THE INVENTION

This invention relates generally to storage and retrieval systems, and more particularly, to a storage and retrieval system having a flexible drive arrangement for loading and unloading articles such as tote bins stored in respective compartments of a matrix arrangement of such compartments; the load/unload drive arrangement having a flexible drive loop arranged to move along a predetermined drive path which is disposed centrally with respect to the articles, and a latching push and pull member for permitting pulling of a tote bin from a compartment or pushing a tote bin into a compartment which is misaligned during the replacement phase of operation.

Storage and retrieval systems are generally known to consist of a plurality of compartments forming a two-dimensional matrix for storing articles and a mechanized arrangement, which may be a stacker crane, for removing a selected article from its compartment, and loading the article onto a transfer carriage so that it may be conveyed to a predetermined location; which location may be a utilization area for the article, an order inventorying station with a human operator, or another compartment. After the desired manipulation of the article has been performed, the mechanism on the transfer carriage can reinsert an article into a compartment. In several known storage and retrieval systems, the compartments are arranged in the form of a two-dimensional matrix having a plurality of rows and columns and open ends in a single plane. Additionally, a second matrix of compartments may be arranged parallel to the first matrix thereby creating an aisle therebetweeen. A stacker crane moves horizontally along the aisle and transports a transfer carriage vertically, such that the transfer carriage and its attendant mechanisms remove and replace articles from at least the first matrix of compartments, and in facilities where there is a plurality of matrices, inter-matrix transfer of articles may be performed.

It is generally preferred that the articles have certain uniform characteristics and dimensions so that the storage and retrieval processes are facilitated. Such uniformity between the articles has been achieved by placing the particular goods which are being warehoused in tote bins which are specifically adapted for use in a storage and retrieval system. Of course, the commodities which may be stored in the various bins come in a variety of sizes. Thus, it is desirable that the tote bins be configured to have at least one dimension which is commensurate with the dimensions of the commodity stored therein, all within the context of maintaining a high storage density for the overall facility. In other words, the commodities should be stored in the smallest tote bins which will accomodate them, and all such tote bins should be arranged in one matrix of compartments such that the adjacent aisle need be only wide enough to accommodate the tote bins and the required transfer carriage and mechanisms.

It is well established in the industry that there exists the need for systems which can access and retrieve articles stored in a matrix of compartments while also providing high storage density. In some commonly used equipment, a variety of limiting characteristics are present in the design of the equipment which adversely effects storage density.

Several of the characteristic limitations inherent in known storage and retrieval equipment are evident in the structure described in U.S. Pat. No. 3,802,580 to Castaldi. This reference described an inventory storage system wherein an arm enters a selected compartment and penetrates to engage behind the rearmost article arranged therein. Outward travel of the arm with its engagement apparatus deployed moves all of the articles in a direction outward of the compartment until a preselected number of articles are deposited onto a platform. The engagement apparatus is then disengaged, and the arm is withdrawn from the compartment. First, it is evident that there must be sufficient space provided in each compartment for all of the articles stored therein and sufficient space must remain for the arm to penetrate into the compartment. Clearly, such a compartment must be substantially larger than is necessary to accomodate the articles stored therein, thereby limiting the overall storage density of the system. It is further evident from this known structure that the arm must extend into the compartment for a depth sufficient to permit the engagement apparatus to be deployed on the inward side of the innermost article. Clearly, as such an arm is withdrawn from the compartment, the width of the aisle between consecutive, facing compartment matrices must be sufficiently large to accomodate the arm transversely therein. Since the arm must be even longer than the depth of the compartment, such that it may be supported at the platform while it is extended, the large minimum required width of the aisle severely reduces overall storage capacity and density in the facility.

There is, therefore, a need for a storage and retrieval system which does not require penetration into the compartment by an arm, and it is accordingly one object of this invention to provide such a system.

A known warehouse crane which is subject to the limitation just mentioned is described in U.S. Pat. No. 4,358,293 to Dechantsreiter. The known arrangement which is the subject of this patent reference is provided with a pair of rotatable chain loops extending horizontally along a transfer carriage of fixed length; the four chain loop extending parallel to the direction of travel of a tote bin which is desired to be conveyed. The length of this transfer carriage is fixed for use in facilities wherein the aisles are of uniform width. The designers of the known structure, however, recognized the need for moving the transfer carriage transversely within an aisle, and therefore provided a mechanism by which the transfer carriage is moved, over a limited range, with respect to its support beams.

It is a problem with this known tote bin storage system, and others, that a tote bin which is desired to be inserted at a storage compartment may jam during insertion as a result of misalignment, thereby requiring manual realignment to perform the storage procedure. This results from the fact that generally a tote bin is inserted into its storage compartment by operation of a push member which is not otherwise secured to the tote bin. Thus, the push member can not be utilized to withdraw a jammed tote bin outwardly from the compartment. This problem is compounded by the fact that a jammed tote bin is out of position for engaging with the pull member, thereby requiring the jammed tote bin to be cleared manually. Moreover, such systems engage with the tote bins off center, thereby causing the misalignment of the tote to persist.

The inability of the known storage and retrieval systems to correct a jammed tote bin situation without human intervention is evident in U.S. Pat. No. 4,352,622 to Weischel. Weischel describes an article transfer arrangement wherein counter-rotating chains are provided on respective sides of a transfer carriage. The counter-rotating chains are each provided with a push member and a pull member which communicate with respective push and pull surfaces of a tote bin. This known arrangement is provided with a push member which does not engage with the tote bin except for the communication with the push surface thereof. Thus, in the event that a tote bin should become jammed as a result of a misalignment during the insertion procedure, manual intervention is required to effect correction. Correction of the jammed tote bin situation can not be achieved by reversing the drive of the chains because the push member will simply move away from the tote bin, and the tote bin is out of position for engagement with the pull members.

It is therefore, yet a further object of this invention to provide an article transfer arrangement wherein tote bins which become jammed during the storing procedure can be withdrawn outwardly of the compartment without manipulation by a human operator.

SUMMARY OF THE INVENTION

The foregoing and other objects are achieved by this invention which provides a storage and retrieval system for a plurality of articles which are arranged in respective compartments arranged in a matrix of such compartments, the compartments being open at a substantially common access surface. In one embodiment of the invention wherein the articles are tote bins each such bin is provided with an engagement portion which has associated therewith a pull surface which faces toward the tote bin and a push surface outwardly from the tote bin. A transfer carriage which is movable to a variety of locations in the vicinity of selected ones of the compartments is provided with a flexible drive arrangement having push and pull members affixed thereto. The flexible drive arrangement is driven along a drive path which is defined by a plurality of rotating elements. In a preferred embodiment wherein the flexible drive arrangement is a chain, the rotating elements engaged therewith are sprockets which define the path of the chain. In accordance with the invention, the drive path along which the flexible drive arrangement is driven is in the form of a closed, continuous loop, a portion of which is arranged centrally with respect to the tote bin. The push member is provided with latching means by which the tote bin is latchingly engaged to permit the tote bin to be withdrawn outwardly of a compartment into which it is being loaded upon reversal of the drive direction to permit unjamming of the misaligned tote bins.

In one embodiment of the invention, the rotating elements are coupled to one another by threaded engagement with screw-threaded shafts. As the shafts are rotated, the distances between the rotating elemengs are varied until a desired configuration for the drive path is achieved. However, the overall length of the drive path remains constant as the configuration is varied. In this manner, the dimensions of a transfer carriage can be preconfigured easily for different warehouse installations. It is an advantage of the present invention that articles which are desired to be removed from compartments are engaged in the vicinity of the opening of the compartment and drawn onto a transfer carriage. If the article to be transferred is relatively short, such an article may be stored in one of a matrix of compartments adjacent to an aisle which is relatively narrow. In this situation, the drive path is altered advantageously to ensure that the transfer carriage can be accomodated within the aisle. Conversely, if the article to be retrieved is relatively long, it must be stored in one of a matrix of compartments located adjacent to a relatively wide aisle, and the drive path of the flexible drive means is correspondingly adjusted. The length of the drive portion of the drive path can be preconfigured, at least over a limited range, prior to the initial operation of the system with a given warehouse facility.

In accordance with the invention, the article transfer arrangement is provided with a flexible drive member which is arranged as a continuous, rectangular loop on the transfer carriage. In one embodiment, the flexible drive member is a chain which is arranged substantially parallel to an article support surface of the transfer carriage. The article support surface supports the articles while they are conveyed inwardly and outwardly with respect to the associated matrix locations. A pull member is coupled to the flexible drive member for engaging with a preselected one of the articles and urging the preselected article outwardly away from the compartment in which it is stored and onto the article support surface of the transfer carriage as the flexible drive member is driven. In addition, a push member is coupled to the flexible drive member at a location thereon which is distal from the location where the pull member is coupled to the flexible drive member. Each of the pull and push members extend essentially radially outwardly with respect to the closed loop formed by the flexible drive member; the pull member extending outwardly for a greater distance than the push member. The push member is provided with a latching mechanism which, as the push member engages the article at a push surface thereof, the latching mechanism communicates with a pull surface of the article so as to permit the direction of travel of the article to be reversed upon reversing the direction of drive of the flexible drive member.

In a preferred embodiment, the articles which are transferred in and out of the storage locations are storage bins which are provided with downwardly tapering sides and a depending member near the bottom of the tote bin. The depending member forms on its outwardly facing surface a push surface which communicates with the push member during the storing process, and the inwardly facing surface of the depending member forms a pull surface for engaging with the pull member during the retrieving process. Each of the pull and push members is provided with at least one upwardly extending engagement member at its radially outermost portion. Thus, the upwardly extending engagement member of the pull member is radially more outward from the continuous loop of the flexible drive member than the engagement member of the push member.

The latching mechanism which is associated with the push member, is provided with a resiliently loaded latch which, as the push member communicates with the depending member of the tote bin, is passed beneath the depending member so as to be resiliently engaged with the pull surface of the depending member. In this manner, should the tote bin jam as a result of its being misaligned during its replacement into the compartment, the direction of drive of the flexible drive member can be reversed such that the tote bin is withdrawn outwardly from the compartment via the communication between the latching mechanism and the pull surface of the depending member of the tote bin. This capacity of the inventive apparatus to permit an article to be drawn outwardly from its compartment by simply reversing its direction of drive during the storing process greatly reduces the need for intervention by a human operator following a jamming of a misaligned tote bin.

BRIEF DESCRIPTION OF THE DRAWINGS

Comprehension of the invention is facilitated by reading the following detailed description in conjunction with the annexed drawings in which.

DETAILED DESCRIPTION

This disclosure is made in the context of an automatic storage and retrieval system of the type fully disclosed in U.S. Pat. No. 3,802,580 to Castaldi and generally described above in the statement of the prior art. In particular, this invention is directed to the transfer carriage and item-engaging mechanism of a stacker crane. Any known stacker crane mechanism for effecting the horizontal and vertical movement of the transfer carriage with respect to the storage compartment matrix can be utilized with the novel mechanism described hereinbelow.

Figure 1:
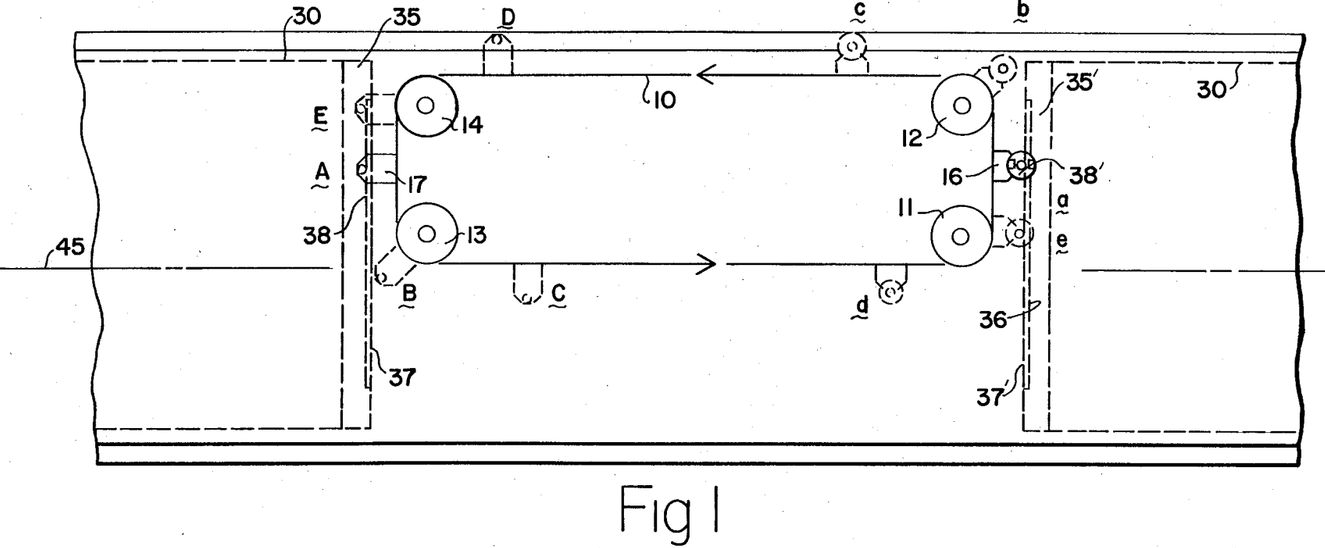
FIG. 1 is a partially schematic and partially cross-sectional top plan view of one embodiment of an article transfer arrangement in accordance with the invention.

FIG. 1 is a top plan view, partially in cross-section and partially in schematic representation, of an embodiment of the invention wherein a flexible drive member 10, which may be a chain, is arranged to surround four sprockets 11 to 14, in this specific illustrative embodiment. It is to be understood, however, that flexible drive member 10 may be a cable or some other suitable apparatus, in which case, sprockets 11 to 14 would be replaced with appropriate pulleys. Flexible drive member 10 has affixed thereto a push member 16 and a pull member 17.

Figure 2:
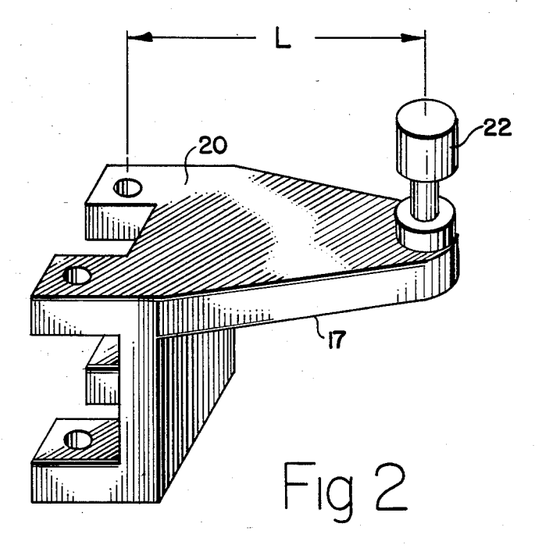
FIG. 2 is an isometric representation of one embodiment on a pull pin for pulling articles from a compartment onto a stacker carriage of the transfer arrangement.

FIG. 2 is an isometric representation of a specific embodiment of pull member 17. As is evident from this figure, pull member 17 is similar to the push member which will be described below with respect to FIG. 5 except that the push member is shorter than the pull member in the direction measured by L on FIG. 2. The pull member is provided with a mounting portion 20 which, in this embodiment, is configured to facilitate its coupling to flexible drive member 10, which is a link chain similar to a bicycle chain. The pull member is provided at a portion distal from where the chain is coupled with an engagement roller 22. As will be described hereinbelow, the engagement portion is adapted to communicate with the pull surface of the article, illustratively, a tote bin handle or engagement portion, which will be described below with respect to FIGS. 4A–4C.

Returning to FIG. 1, push member 16 is shown in a variety of locations a-d. The various locations of push member 16, as flexible drive member 10 moves, have corresponding positions for pull member 17, which positions are identified as A–D. It is evident from FIG. 1 that push member 16 and pull member 17 are distalmost from one another on flexible drive member 10. Thus, push member 16 at location a is a predetermined distance from pull member 17 at a location A, irrespective of the direction along flexible drive member 10 in which the distance is measured.

Figure 4A:
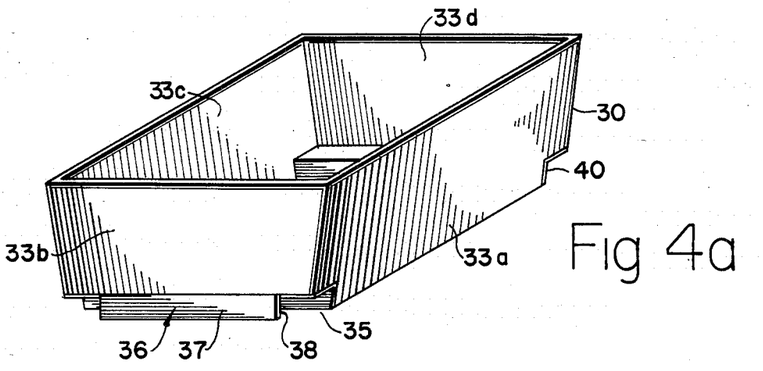
FIGS. 4A, 4B, and 4C are isometric representations of tote bin embodiments having tapered sides and an engagement portion.
Figure 4B:
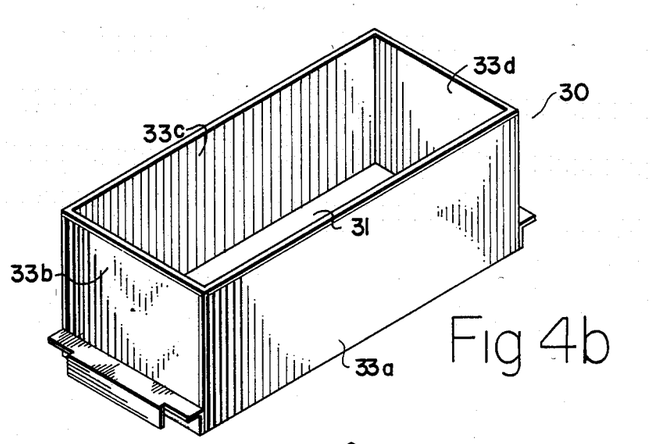
Figure 4C:
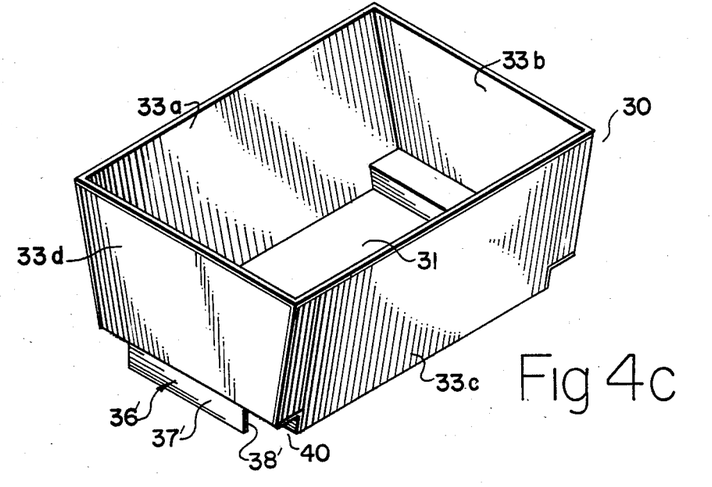

FIG. 1 further shows a tote bin 30 in various stages of transference depending upon the positions of the push and pull members. A specific illustrative embodiment of tote bin 30 is shown in the isometric representation of FIGS. 4A–4C. As shown in these figures, tote bin 30 has a bottom surface 31 and four upwardly extending sides 33a–33d. In FIG. 4B, sides 33a–33b are perpendicular to bottom surface 31. In FIGS. 4A and 4C, the sides taper downwardly such that opposing ones thereof are nearer to each other in the vicinity of bottom surface 31, and further apart at the open upper end. Near the bottom of the tote bin is provided an engagement portion 35 having a depending member 36. Depending member 36 is provided with a push surface 37 which faces outwardly away from the tote bin, and a pull surface 38 which faces inwardly toward the tote bin.

Returning to FIG. 1, pull member 17 at position D approaches sprocket 14 and is in the process of going around sprocket 14 at position E. At position E, the pull member begins to enter engagememt portion 35 behind depending member 36 thereof. At position A, the engagement portion 22 of pull member 17 is traveling within engagement portion 35 as the pull member is moved between sprockets 13 and 14.

At position B, pull member 17 is approximately in the center of tote bin 30 as indicated by centerline 45. Pull member 17 begins to pull tote bin 30 out of its compartment as the pull member rounds sprocket 13. At position C, tote bin 30 is partially removed from its compartment. Upon rounding sprocket 11, pull member 17 would begin to move outwardly toward sprocket 12 without further displacing tote bin 30. Thus, upon rounding sprocket 12, the pull member would be completely disengaged from the tote bin and its transference onto the transfer carriage (not specifically identified) would be completed. It should be noted that the length of the transfer carriage corresponds to the length of the tote bin.

In this embodiment of the invention, it is desired to transfer tote bin 30, which at this moment is on the transfer carriage (not shown), to a compartment on the other side of the transfer carriage from where it was removed. This is achieved by continuing the motion of flexible drive member 10 in the direction of the arrows until push member 16 communicates with a push surface of a rear engagement portion 40 (see FIG. 4A) of the tote bin. In this embodiment of the invention, engagement portions 35 and 40 are identical to one another as demonstrated on FIG. 4C which is the rear view of FIG. 4A. The driven motion of the flexible drive member 10 is continued until push member 16 begins to round sprocket 14, as shown at position D. The push member then continues along the push surface 37' as it travels between sprockets 14 and 13, without further motion of tote bin 30. As push member 16 travels past sprocket 13 in the direction of sprocket 11, it pushes tote bin 30 into a compartment on the other side of the transfer carriage as shown on the right hand portion of FIG. 1. Thus, a tote bin has been removed from one compartment, deposited on the transfer carriage, and inserted into an oppositely facing compartment. Of course, in order to return the tote bin from the right hand portion of FIG. 1 to the left hand portion, the direction of drive chain 10 is reversed and pull member 17 and push member 16 perform the same tasks, but in the opposite direction. Although the oppositely facing compartments are shown to register with one another, such registration is not necessary in the practice of the invention, as there may be a motion of the entire transfer carriage while the tote bin is loaded thereon to a further compartment (not shown) which need not register with the compartment from which the tote bin was withdrawn.

Figure 3:
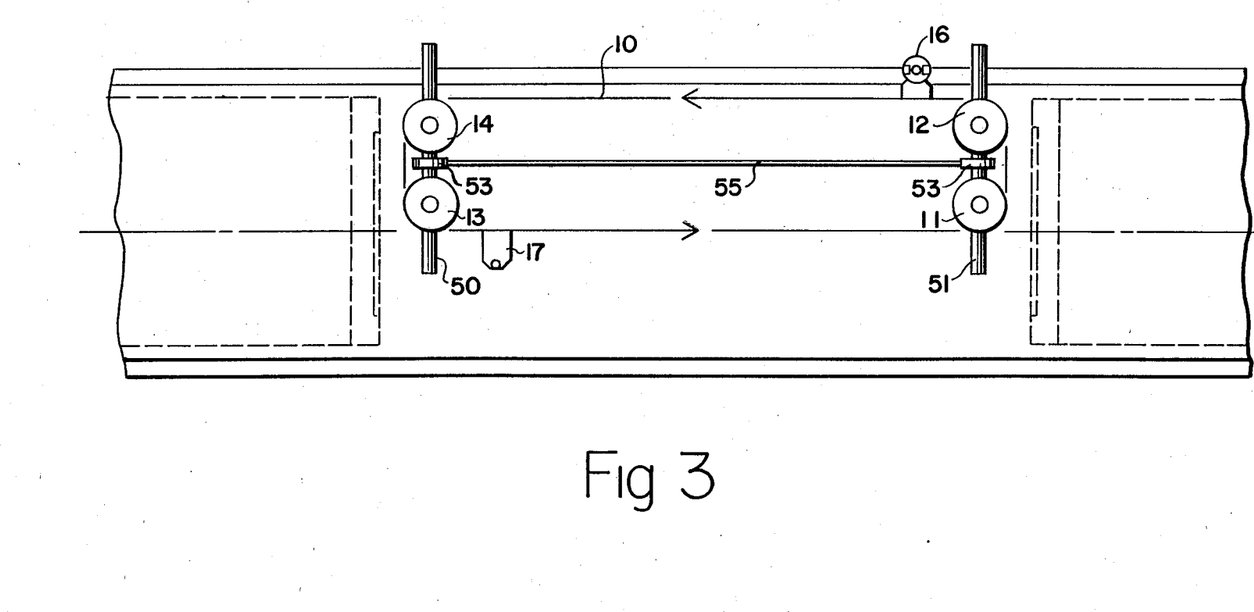
FIG. 3 is a partially schematic and cross-sectional representation of the embodiment of FIG. 1 after having been adjusted to operate within a narrower aisle and compartment opening.

FIG. 3 is a partially schematic and cross-sectional representation of the embodiment of FIG. 1 after it has been reconfigured by the controlled rotation of threaded shafts 50 and 51. As shown in this figure, threaded shafts 50 and 51 are arranged generally transverse to the opening of the compartment which is desired to be serviced. The elongation of the distance between sprockets 13 and 14 requires a reduction in the distances between sprockets 11 and 13, and 12 and 14, such that the total distance or length of the flexible drive member remains the same. Threaded shafts 50 and 51 may be rotated simultaneously by operation of sprockets 53 and their flexible coupling 55. The flexible coupling may be driven by a human operator during set-up of the equipment, or by a motor (not shown) such that the reconfiguration of the flexible drive member can be performed without the direct assistance of a human operator. The elongation of flexible drive member 10 between sprockets 13 and 14 requires the distance between sprockets 11 and 13, and 12 and 14, to be reduced thereby permitting the entire transfer arrangement to be accommodated within a narrower aisle (not specifically designated) and to accomodate tote bins which are smaller in width while also causing the push and pull members to operate close to the vicinity of center line 55, thereby reducing the possibility of misalignment and jamming of the tote bin.

Figure 5:
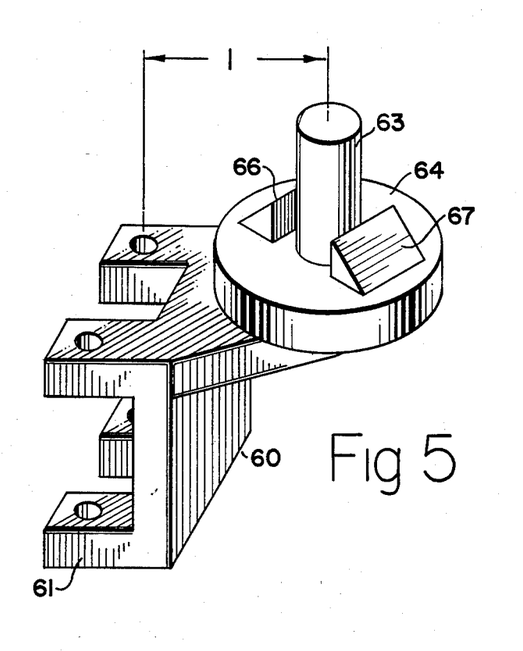
FIG. 5 is an isometric representation of a push pin having a latching mechanism for permitting a jammed tote bin to be pulled from a compartment upon reversal of the drive direction.
Figure 6:
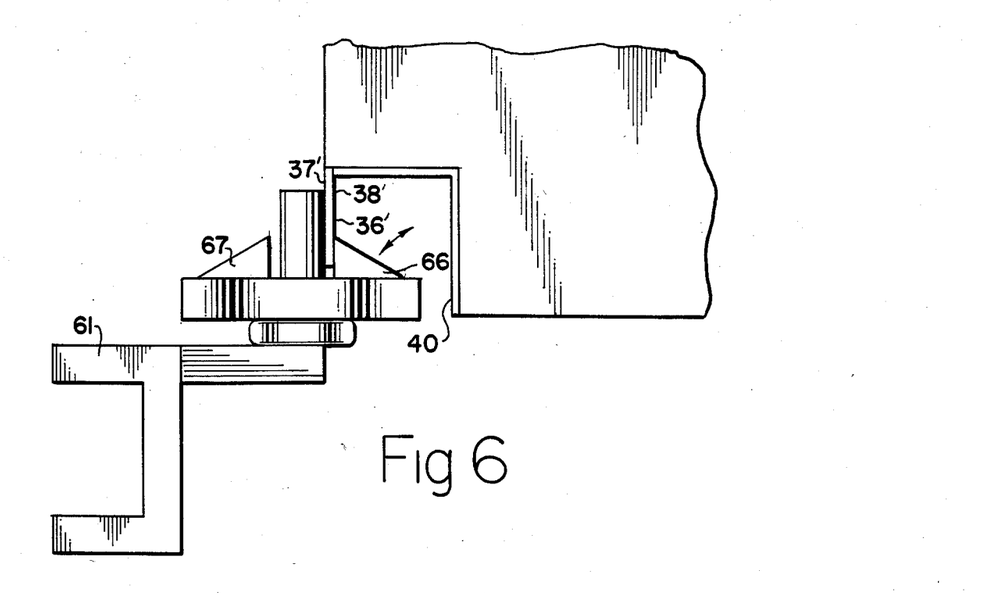
FIG. 6 is a side view illustrating the engagement between the latching mechanism of FIG. 5 and the tote bin of FIG. 4B.

In accordance with a further embodiment of the invention shown in FIGS. 5 and 6, the push member of the invention may be provided with a latching mechanism which permits a tote bin which is being pushed to be moved in the reverse direction on the transfer arrangement, in the event of a jam resulting from misalignment. As shown in FIG. 5, a push member 60 is provided with a mounting portion 61 which couples to the flexible drive member, as discussed hereinabove. Push member 60 is provided with a push pin 63 which communicates with the outermost surface of the depending member of the tote bin. The push pin is provided with a push pin base 64 on which is provided, in this embodiment, two latching members 66 and 67 which are urged resiliently upwardly by resilient mechanism (not shown) such as a spring.

In operation, as push pin 63 is moved into communication with the push surface of engagement portion 40 (or 35 if moving in the opposite direction), one of latching members 66 and 67 is urged downwardly by virtue of its communication with the lowermost edge of depending member 36', as shown in FIG. 6, until it is resiliently urged upwards so as to be in communication with the pull surface 38' of the engagement portion. Thus, if the tote bin should jam as a result of a misalignment, the drive direction of the flexible drive member can be reversed and the latched communication between latching member 66 and pull surface 38' of the engagement portion of the tote bin will permit the tote bin to be drawn backwards, illustratively toward the compartment, without the aid of a human operator.

Push pin base 64 is mounted on mounting portion 61 so as to be rotatable about push pin 63. FIG. 6 illustrates mounting portion 61 when it is rotated 90 degrees from the position in FIG. 5. Push pin base 64 is generally held in a position whereby the latching elements 66 and 67 are arranged substantially aligned with the direction of travel as shown in FIG. 5. Thus, as the push pin is driven along the drive path, one of the latching elements 66 or 67 will latchingly engage with the depending member of a tote bin on the transfer carriage, as discussed hereinabove. As latching engagement begins when push pin 63 rounds the sprocket in the vicinity of engagement portion 40, push pin base 64 is rotated approximately 90 degrees with respect to mounting member 61 as shown in FIG. 6. Upon release of the latching member from the depending member of the tote bin, a rotative resilient mechanism (not shown) urges push pin base 64 approximately 90 degrees in the other direction such that the latching members are once again aligned with the direction of travel. This operation ensures that when the push member approaches a tote bin which is to be pushed into an oppositely facing matrix location, one of the latching members will communicate latchingly with the depending engagement member. And, if the push member approaches a tote bin which is to be pulled from a matrix location, the short length 1 of mounting portion 61 is such that push pin 63 and latching elements 66 and 67 slide parallel to surface 37 or 37' of depending members 35 and 40, respectively.

Although the invention has been described in terms of specific embodiments and applications, persons skilled in the art, in light of this teaching, can generate additional embodiments, without exceeding the scope or departing from the spirit of the claimed invention. Accordingly, it is to be understood that the drawings and descriptions in this disclosure are proffered to facilitate comprehension of the invention and should not be construed to limit the scope thereof.

What is claimed is:

1. An article transfer arrangement of the type wherein a plurality of articles are arranged at respective matrix locations, each open at a substantially vertical common access surface, the article transfer arrangement further having a transfer carriage movable to locations in the vicinity of selected matrix locations for supporting the articles when they are removed from the matrix locations, the article transfer arrangement further comprising:

a single flexible drive means arranged as a continuous driven loop on the transfer carriage and movable in two directions, said continuous loop having as pre-determined configuration and being arranged in a drive plane substantially parallel to an article support surface of the transfer carriage for conveying the articles inwardly and outwardly with respect to the associated matrix locations;

pull means coupled to said flexible drive means for engaging with a selected one of the articles for withdrawing said article from a matrix location as said flexible drive means is driven; and push and pull means coupled to said flexible drive means at a location on said flexible drive means distal from a location thereon where said pull means is coupled, for pushing a selected one of the articles into a matrix location as said flexible drive means is driven in one direction and for pulling said selected article out from said matrix location as said flexible drive means is driven in an opposite direction.

2. The article transfer arrangement of claim 1 wherein said flexible drive means is an endless chain, said flexible drive engagement means comprising a plurality of chain sprockets for engaging with said endless chain.

3. The article transfer arrangement of claim 1 wherein said pull means and said push and pull means extend outward radially from said continuous drive loop of said flexible drive means for respective distances, said pull means extending for a greater distance than said push and pull means.

4. The article transfer arrangement of claim 3 wherein there is further provided a plurality of article engagement means arranged on respective outermost ends of said push and pull means and said pull means.

5. The article transfer arrangement of claim 3 further comprising at least one engagement portion on each of the articles, said engagement portion having a first surface for communicating with said pull means and said push and pull means said first surface facing inwardly toward the articles, and a second surface for communicating with said push means, said second surface facing outwardly away from the articles.

6. The article transfer arrangement of claim 4 wherein each said article engagement means comprises:

a plurality of engagement rollers each having a longitudinal axis;

engagement roller mounting means for coupling respective ones of said plurality of engagement rollers to an associated one of said push and pull means and said pull means, said engagement roller mounting means having a first portion for rotatively engaging with said associated one of said push and pull means and said pull means at said respective outermost end thereof, and a second portion for holding said plurality of engagement rollers whereby said longitudinal axes of said engagement rollers extend substantially parallel with one another and transverse to said drive plane.

7. The article transfer arrangement of claim 1 wherein said article engagement means arranged on said outermost end of said push and pull means is provided with latching means contacting said first surface for bi-directionally coupling with an article whereby said push and pull means can selectably pull said article upon reversing a drive direction of said flexible drive means.

8. An article transfer arrangement of the type wherein a plurality of articles are arranged in respective ones of a first plurality of matrix locations, each open at a substantially vertical first common access surface, the article transfer arrangement further having a transfer carriage movable to locations in the vicinity of selected matrix locations for supporting the articles when they are removed from the first matrix locations, the article transfer arrangement further comprising:

flexible drive means arranged as a continuous loop on the transfer carriage, said continuous loop being arranged substantially parallel to an article support surface of the transfer carriage for conveying the articles inwardly and outwardly with respect to the associated matrix locations, said flexible drive means being drivable selectably in first and second drive directions;

pull means coupled to said flexible drive means for engaging with a selected one of the articles for moving said article in a direction outwardly away from a matrix location and onto the transfer carriage as said flexible drive means is driven in said first drive direction;

push means coupled to said flexible drive means at a location on said flexible drive means distal from a location thereon where said pull means is coupled, for moving a selected one of the articles inwardly toward a matrix location and off of the transfer carriage as said flexible drive means is driven in said second drive direction, said push means having article latch means for latching with said article when said flexible drive means is driven in said first drive direction whereby said article is moved outwardly away from said matrix location when said flexible drive means is driven in said second drive direction, said push means further comprising an article engagement member extending upwardly with respect to said article support surface for communicating with a push surface of said article and resilient latching means for communicating with a pull surface of said article; and wherein said flexible drive means urges said pull means and said push means along a closed drive path, said closed drive path having a first drive path portion along which said pull means and said push means operate to drive the articles, and a second drive path portion substantially orthogonal to said first drive path portion in the vicinity of the substantially vertical first common access surface, said pull means engaging with said pull surface of said selected one of the articles while driven along said second drive path portion, and said resilient latching means communicating with said pull surface of said selected one of the articles while said push member is driven along said first drive path portion.

9. The article transfer arrangement of claim 8 wherein there is further provided a second plurality of matrix locations each open at a substantially vertical second common access surface, said first and second common access surfaces arranged at a first predetermined distance from, and facing, one another, at least one of the matrix locations open at the first common access surface registering with one of said matrix locations open at said second common access surface whereby an article in one of said registering matrix locations is transferred to said other registering matrix location as said flexible drive means is driven in said first drive direction.

* * * * *